US011548768B2

(12) United States Patent
Albrecht

(10) Patent No.: US 11,548,768 B2
(45) Date of Patent: Jan. 10, 2023

(54) REMOTE CONTROL DEVICE FOR CRANE, CONSTRUCTION MACHINE, AND/OR INDUSTRIAL TRUCK

(71) Applicant: LIEBHERR-WERK BIBERACH GMBH, Biberach an der Riß (DE)

(72) Inventor: Benjamin Albrecht, Oberessendorf (DE)

(73) Assignee: LIEBHERR-WERK BIBERACH GMBH, Biberach An der Riss (DE)

( * ) Notice: Subject to any disclaimer, the term of this patent is extended or adjusted under 35 U.S.C. 154(b) by 930 days.

(21) Appl. No.: 16/345,159

(22) PCT Filed: Sep. 22, 2017

(86) PCT No.: PCT/EP2017/001144
§ 371 (c)(1),
(2) Date: Apr. 25, 2019

(87) PCT Pub. No.: WO2018/077459
PCT Pub. Date: May 3, 2018

(65) Prior Publication Data
US 2019/0284027 A1 Sep. 19, 2019

(30) Foreign Application Priority Data
Oct. 26, 2016 (DE) ...................... 10 2016 012 786.4

(51) Int. Cl.
*G06F 7/00* (2006.01)
*B66C 13/16* (2006.01)
(Continued)

(52) U.S. Cl.
CPC .............. *B66C 13/16* (2013.01); *B66C 13/46* (2013.01); *B66F 9/0755* (2013.01); *B66C 13/56* (2013.01);
(Continued)

(58) Field of Classification Search
CPC ......... B66C 13/16; B66C 13/46; B66C 13/56; B66C 13/18; B66F 9/0755; E02F 9/2004; E02F 9/261; H04N 7/18
(Continued)

(56) References Cited

U.S. PATENT DOCUMENTS

| 6,744,372 B1 | 6/2004 | Shaw et al. |
| 9,302,890 B1 | 4/2016 | Vogt et al. |

(Continued)

FOREIGN PATENT DOCUMENTS

| CN | 1395642 A | 2/2003 |
| CN | 104030161 A | 9/2014 |

(Continued)

OTHER PUBLICATIONS

ISA European Patent Office, International Search Report Issued in Application No. PCT/EP2017/001144, dated Dec. 21, 2017, WIPO, 6 pages.

(Continued)

*Primary Examiner* — Yolanda R Cumbess
(74) *Attorney, Agent, or Firm* — McCoy Russell LLP

(57) ABSTRACT

The present invention relates to a remote control device for a crane, a construction machine and/or an industrial truck, comprising a mobile end device in the form of a tablet computer that has a screen having a touch-screen function and at least one input means for inputting control commands in the form of a touch-screen display means, as well as a signal transmission device for transmitting the input control commands to the control apparatus of the crane, of the construction machine and/or of the industrial truck. It is proposed to use the screen of the tablet computer not only to input and display control commands, but also to present actual images and/or desired images of the working environment of the machine so that, on an inputting of control (Continued)

commands via the touchscreen function of the screen, the machine operator can simultaneously monitor the working environment there.

20 Claims, 7 Drawing Sheets

(51) Int. Cl.
 *B66C 13/46* (2006.01)
 *B66F 9/075* (2006.01)
 B66C 13/56 (2006.01)
 E02F 9/20 (2006.01)
 E02F 9/26 (2006.01)
 H04N 7/18 (2006.01)

(52) U.S. Cl.
 CPC .............. *E02F 9/2004* (2013.01); *E02F 9/261* (2013.01); *H04N 7/18* (2013.01)

(58) Field of Classification Search
 USPC ........................................ 700/229, 9; 701/50
 See application file for complete search history.

(56) References Cited

U.S. PATENT DOCUMENTS

| | | |
|---|---|---|
| 2014/0223235 A1 | 8/2014 | Gundlapalli et al. |
| 2014/0258908 A1 | 9/2014 | Miyoshi |
| 2015/0149026 A1* | 5/2015 | Oswald .................. B66C 23/88 701/32.8 |

FOREIGN PATENT DOCUMENTS

| | | |
|---|---|---|
| CN | 104303194 A | 1/2015 |
| DE | 102012014655 A1 | 3/2014 |
| DE | 102012216489 A1 | 3/2014 |
| DE | 102013011818 A1 | 1/2015 |
| DE | 102014009165 A1 | 12/2015 |
| DE | 102014216982 A1 | 3/2016 |
| JP | H0326697 A | 2/1991 |
| JP | 2002345058 A | 11/2002 |
| JP | 2004284730 A | 10/2004 |
| JP | 2016023489 A | 2/2016 |
| KR | 20140122699 A | 10/2014 |

OTHER PUBLICATIONS

Suter, J. et al., "Evaluation and integration of a wireless touchscreen into a bridge crane control system," Proceedings of the 2007 IEEE/ASME International Conference on Advanced Intelligent Mechatronics, Zurich, Switzerland, Sep. 4, 2007, 6 pages.

Intellectual Property India, Office Action Issued in Application No. 201917015581, dated Jun. 25, 2021, 6 pages.

State Intellectual Property Office of the People's Republic of China, Office Action and Search Report Issued in Application No. 201780066622.6, dated Mar. 2, 2020, 16 pages. (Submitted with Partial Translation).

* cited by examiner

REMOTE CONTROL DEVICE FOR CRANE, CONSTRUCTION MACHINE, AND/OR INDUSTRIAL TRUCK

CROSS-REFERENCE: To RELATED APPLICATION

The present application is a U.S. National Phase of International Patent Application Serial No. PCT/EP2017/001144 entitled "REMOTE CONTROL DEVICE FOR CRANE, CONSTRUCTION MACHINE, AND/OR INDUSTRIAL TRUCK" filed on Sep. 22, 2017. International Patent Application Serial No. PCT/EP2017/001144 claims priority to German Patent Application No. 10 2016 012 786.4, filed on Oct. 26, 2016. The entire contents of each of the above-cited applications are hereby incorporated by reference for all purposes.

TECHNICAL FIELD

The present invention relates to a remote control device for a crane, or more broadly a construction machine and/or an industrial truck, the remote control device comprising a mobile end device in the form of a tablet computer that has a screen having a touch-screen function, and at least one input means for inputting control commands in the form of a touch-screen display means, as well as a signal transmission device for transmitting the input control commands to the control apparatus of the crane, or of the construction machine and/or of the industrial truck.

BACKGROUND AND SUMMARY

A remote control device for a crane in the form of a tablet is known, for example, from document DE 10 2014 216982 A1. To avoid unwanted control commands due to unintentional touching of the touchscreen surface, it is proposed therein to use an additional confirmation button to confirm control commands that is implemented by an additional hardware module dockable at the tablet computer. On a use of a tablet computer as a remote control for a crane, a construction machine, or an industrial truck, there is, however, not only the named problem of the unintentional control commands due to an unwanted touching of the screen, but also, above all, a problem due to lack of a comfortable and realistic communication of the control functions that provides the user of the remote control with an intuitive control feeling (for remote control operation of the crane or machine.

Cranes and similar large units (or construction machines or industrial trucks and equipment) such as piling and drilling rigs, surface miners, or cable-operated excavators are very complex in operation and control. In this context, it is not only the plurality of control functions and their interactions as well as the accompanying input means such as joysticks, foot pedals, and control switches which are quite complex as a whole that are a problem, but also the often unaccustomed, machine-specific reactions of the machine structure to movements of the actuating drives.

Missing crane reactions and a lack of realism are, in general, particular problems in the remote control of cranes and construction machinery or industrial trucks, the problem causing uncertainty for the machine operator. If, for example, a crane is remote controlled, the remote operator often does not feel the typical crane reactions that intuitively give him the feeling (that would be provided to the operator on a direct control in the crane operator's cab) of having controlled the crane (or construction machine or industrial truck) correctly or incorrectly.

To make the remote control more realistic, it has already been considered to use an approximately realistic control station that can, for example, correspond to the crane operator's cab of a respective crane type and can have control commands via input means provided such as joysticks, pedals, control switches, or touchscreen. Such remote controls that are similar to crane operators' cabins are, however, stationary and do not permit the crane operator to observe specific work such as the lashing of the lifting hook (or other work tools) in detail directly on site. It is additionally not possible to change location to have a better overview in dependence on the job.

Against this background, remote controls are advantageous per se that have a mobile end device from where the crane operator can control and monitor crane movements at any desired locations. Such mobile end devices in the form of tablets such as are used in document DE 10 2014 216982 A1, are however, to date in need of improvement with respect to the control comfort and to date do not really satisfy the demands of the complex control functions of cranes and similar large units.

A further remote control system for a crane is known from document DE 10 2012 216 489 A1, wherein this already known remote control should be able to be used for work machines of different types. The remote control there is provided with a selection mechanism that permits the number of operation and selection menus of the display of the remote control to be reduced depending on the configuration in which the connected work machine is. There is, however, a lack of sufficient realism in the above-described manner in this remote control that is also hardly, improved by the adaptation of the operation menu to the respective work machine.

A crane simulator that works with virtual representations of the crane surroundings is known, for example, from document DE 10 2013 011 818 A1. A crane operator's cab is provided there as a control station having corresponding input means, with the viewing windows or the glazing of the simulated crane operator's cab being replaced with screens on which the virtual representation of the crane surroundings is shown.

Starting from this, it is the underlying object of the present invention to provide an improved remote control device of the initially named type having a tablet computer which avoids disadvantages of the prior art and further develops the latter in an advantageous manner. A more realistic, more comfortable remote control of the crane operation or of the machine operation should in particular be achieved that better takes account of the complex crane behavior or machine behavior and that makes the remote control ability more reliable.

The named object is achieved in accordance with the invention by a remote control device for a crane, for a construction machine, or for an industrial truck, having a mobile end device in the form of a tablet computer that comprises a screen having a touchscreen function and that has at least one input device for inputting control commands in the form of a touchscreen display device and that has a signal transmission device for transmitting the input control commands to a control apparatus of the crane, of the construction machine, or of the industrial truck, wherein the mobile end device is configured to receive image data from a camera and/or digital data from a building information model (BIM); to display a representation of the machine environment and/or of a work tool of the machine on the screen with reference to the received image data of the camera and/or to the digital data from the building information model; and to display the input device for inputting control commands at least at times simultaneously with the representation of the machine environment and/or of the work tool.

It is therefore proposed to use the screen of the tablet computer not only to input and display control commands, but rather also to present actual images and/or desired images of the working environment of the machine so that, on an inputting of control commands via the touchscreen function of the screen, the machine operator can simultaneously monitor the working environment there. In accordance with the invention, the tablet computer of the remote control is configured to receive image data from a camera and/or digital data from a building information model, a so-called BIM, and/or to display a representation of the machine environment and/or of a work tool of the machine with respect to the received image data of the camera and/or to the digital data of the building information model, and to display the input means for inputting control commands in the form of the touchscreen element on the screen at least at times simultaneously, with the presentation of the machine environment and/or of the work tool. The screen of the tablet computer therefore simultaneously serves as a monitor for observing the working environment and/or the work tool of the remote-controlled machine, on the one hand, and as a control panel for displaying and inputting control commands, on the other hand. A more comfortable and safer remote control can hereby be achieved since the working environment in which the movements to be remote controlled are to be carried out is also presented to the machine operator on the observation of the input interface for the control commands without the machine operator having to move his gaze to and fro.

Said input means for inputting control commands in the form of a touchscreen display element can here advantageously be directly faded into the representation of the machine environment and/or of the work tool in the manner of a superposed representation so that the touchscreen display element is so-to-say shown against the background of the displayed working environment or machine environment on the screen of the tablet computer. This can be used, for example, to display travel and/or adjustment movement commands particularly graphically by, means of corresponding symbols and hereby to make an intuitive operation possible for the machine operator. For example, travel arrows in the possible travel directions—that is, for example, up-down, right-left and forward-backward—in the form of arrows can be faded into an image that shows the lifting hook of a crane, said arrows extending away in the corresponding directions from the lifting hook shown.

Alternatively or additionally to such touchscreen display elements faded into the image of the working environment, it is, however, likewise possible to present said touchscreen display elements for the inputting of control commands in a separate window on the screen of the tablet computer, said window, for example, being permanently displayed at an edge of the screen or being invokable as required in the manner of a pop-up window and being placed over the window of the image representation of the machine environment.

The image of the machine environment and/or of the working area and/or of the building to be erected and/or of the work tool of the machine presented on the screen of the tablet computer can advantageously also comprise a virtual representation that is generated from a construction site information model using building information and/or construction site information. For this purpose, the tablet computer can comprise a graphical simulation module for calculating the virtual representation, with such a graphical simulation module advantageously, being able to be connected to a data interface at the tablet computer for importing the building information and/or construction site information. An image processing device of the tablet computer can comprise for generating and/or adapting the virtual representation of the machine environment and/or of the building and/or of the work tool from the construction site information model in dependence on the imported digital data.

The tablet computer can here advantageously comprise a CAD interface as the data interface by means of which CAD data can be imported into the tablet computer with reference to which a virtual representation can be generated on the screen of the tablet computer by the simulation model. Alternatively or additionally, the tablet computer can comprise an image data interface by means of which digital image data can be imported with reference to which then the virtual representation of the machine environment and/or of the work tool and/or of the building can be generated by said image processing device.

However, advantageously, not only virtual representations can be displayed on the screen of the tablet computer, but also actual images of a camera can be shown. To display an image that is as realistic as it is informative and with reference to which the remote-controlling machine operator can intuitively control the machine, the mobile end device in an advantageous further development of the invention has a display control apparatus by means of which a superposed screen presentation in the manner of a virtual reality image can be generated on the screen of the tablet computer that is assembled from the received image data of a camera and the received digital data from said construction site information model BIM and thus from a camera image of the machine environment, on the one hand, and from a virtual representation of the machine environment or of a building part, on the other hand.

With such an assembled virtual reality image that is displayed on the screen of the tablet computer and that is optionally augmented by the previously explained touchscreen display elements for inputting control commands, the actual image of a construction site provided by one or more cameras can, for example, be supplemented by contours of a building still to be erected so that the remote-controlling machine operator knows precisely where a respective element is to be traveled to. In this respect, building contours already present in the actual image and virtual building contours that correspond to the next workstep can be supplemented so that the contour to be erected in the next workstep is displayed in the shown actual image on the screen of the tablet computer.

Alternatively or additionally, for example, certain positions such as a delivery station for elements, a storage position for components, or boundaries of the permitted work area can also be faded in on the actual camera image of the working environment of the machine to be controlled.

The camera-generated representation of the working environment of the machine to be remote controlled can be a cyclically updated image that is provided in the manner of a webcam or can also be a continuously streamed live image. Such a real camera-generated representation of the machine environment and/or of the piece of working equipment can in particular be produced in the form of a live image or of a TV picture-like video image, wherein a corresponding video signal is transmitted from the at least one camera at the remote controlled machine to the remotely arranged tablet computer of the remote control device and is reproduced by its screen.

Alternatively or additionally to a video camera or television camera, it is also possible to work with other imaging sensors, for example with an infrared sensor and/or a radar sensor and/or a photo mixing detector and/or a time-of-flight sensor in the form of a time-of-flight detector in which measurement objects are illuminated by light pulses and the signal time of flight is measured on the basis of which the distance between the camera and the object can be calculated and a three-dimensional image can be generated. A plurality of imaging sensors of different image categories can advantageously also be used, for example a camera in conjunction with an infrared sensor, with their images being able to be superposed and displayed in a common image, for example such that the hot parts of an infrared image that can, for example, indicate persons are overlaid on the camera image. The use of a video camera and/or television camera is, however, advantageous to the extent that a realistic image is generated that communicates the feeling of seeing with his own eyes to the machine operator.

Such a camera or imaging sensor system for representing the machine surroundings or the piece of working equipment of the remote controlled machine can, for example, be fixedly or pivotably attached to the machine itself, for example to the crane operator's cab of a crane and/or to the trolley of a revolving tower crane or to another suitable position, with the camera advantageously being aligned such that the piece of working equipment, for example the lifting hook of a crane, can be observed. A plurality of cameras can advantageously also be provided here to be able to observe the piece of working equipment from different perspectives.

In an advantageous further development of the invention, a camera that is travelable and/or can be moved to different locations can be used that permits the piece of working equipment and/or the machine surroundings to be presented from different directions of view.

In a further development of the invention, a camera can in particular also be used that is mounted on an aerial drone. It is therefore proposed to use a remote-controlled aerial drone which is equipped with a camera and by means of which the desired camera image of the piece of working equipment and/or of the equipment environment can be provided from different directions of view. A perspective, camera image of the piece of working equipment and of its environment can in particular be provided from oblique viewing axes by means of such an aerial drone, with said Oblique viewing axes being able to be acquired from a point spaced apart from the machine and its operator's cab and from above the ground so that the piece of working equipment and its environment can be made visible to the machine operator from a direction of view such as an external observer would also see. With a crane, camera images of the lifting hook and of its surroundings can be provided that look at the vertical center crane plane through the boom obliquely from the side or in a perpendicular manner, for example. Images of the lifting hook can also be provided from drone positions that are disposed in this center crane plane passing through the boom. The relative positions between the piece of working equipment and its environment or a destination point can be visualized very much better by such perspective camera images from different viewing axes.

To enable a simple operation of the aerial drone, the aerial drone can be controlled in a further development of the invention in dependence on a machine position and/or on a position of a piece of working equipment such that the aerial drone also automatically follows machine movements, in particular movements of a piece of working equipment and at least approximately, maintains or attempts to maintain and tracks a desired position relative to the machine and/or to its piece of working equipment on machine movements, in particular on movements of a piece of working equipment. If the aerial drone is used in conjunction with a crane, for example, the aerial drone can automatically follow the lifting hook of the crane with an activated automatic follow mode. If, for example, a relative position of the aerial drone at approximately the lifting hook height or a little above it with a lateral spacing from the vertical center crane plane through the boom is desired and set, the aerial drone can automatically lower or elevate its operating altitude when the lifting hook is lowered or raised and/or can fly forward or backward in parallel with the vertical center crane plane when the trolley of the crane is traveled and/or can fly laterally, transversely to the left or right when the crane is rotated.

The aerial drone can, however, advantageously also be autonomously remote controlled such that different desired positions relative to the machine and/or to its piece of working equipment can be freely flown to by the aerial drone. This can, for example, take place by inputting a desired position for the aerial drone relative to the lifting hook or to the piece of working equipment on the touchscreen of the tablet computer, for example such that a position is input with respect to the lifting hook, for example in the form of "2 m above laterally to the right of the lifting hook" in a position control module that can be provided on the tablet computer. Alternatively or additionally, however, the aerial drone can also be flown completely freely with respect to the machine and its piece of working equipment, for example with the aid of touchscreen control displays, to fly the aerial drone for so long until the camera position and its angle of view on the piece of working equipment and its environment satisfies the crane operator or machine operator.

The camera control module can be stored on the tablet computer in the form of a software module, for example as a downloadable app, with control commands for the changing of the camera positon and/or the direction of view of the camera being able to be displayed, for example, in an invokable control window as a touchscreen display means.

Said virtual representation of the machine environment can advantageously be changed by the graphical simulation module and can be adapted to different scenarios in dependence on different data sets that can be imported into the simulation module via an interface. Planning data such as CAD data of a building to be erected and/or actual construction site information that reproduce the actual status of a building or structure being built in dependence on the construction progress can in particular be imported into the simulation module via a corresponding data interface and can be used by the simulation module to generate or adapt the virtual representation of the machine surroundings in accordance with the imported data set, in particular in dependence on the imported planning data and/or the actual construction site information.

Said information on the construction site or building can, in the aforesaid manner, be CAD data or other geometrical data of the building or of the construction site, with optionally digital image data also being able to be used that reproduce the actual building and its construction progress. Such image data can be imported into the graphical simulation module as machine environment data via said CAD interface or a suitable image data interface, said graphical simulation module then adapting the virtual representation to these taken over CAD data and/or image data.

The modeling of a planned or already existing or partly completed construction site and the corresponding generation of the virtual representation of the machine environment by the graphical simulation module is in particular also a valuable resource to ensure the logistics on a construction site and also already to be able to simulate and practice critical routines before the start of construction.

In an advantageous further development of the invention, the remote control device can be connected to different units, in particular to different unit types, and can establish control communication with the respective selected unit. Such units can in particular be different pieces of equipment used on a construction site such as cranes, excavators, crawler-type vehicles, or similar machines, but also units used at different locations. Depending on which unit is to be remote controlled, a control communication connection can be established by the remote control device and/or by the respective unit, for example by selecting a respective IP address over a router if the connection takes place via a network or also in a different manner. To enable sufficiently rapid data communication between the remote control and the machine, a communication link of high bandwidth is advantageously selected to avoid real time problems or a time delay between the control commands and the machine reactions.

To be able to map the machine reactions of different machine types realistically, the remote control device can, in a further development of the invention, have a configuration module by means of which the remote control device can selectively be preconfigured for a respective machine type to be remote controlled. Said preconfiguration means can adapt the touchscreen control elements displayed on the screen of the tablet and the selection of the actuation menus and screen representations to the respective device. Preconfiguration means can, however, also in particular be provided for the movement control by means of which the displayed control elements for the drive apparatus of the machine can be reconfigured and adapted to the respective machine type since, for example, a top stewing, revolving tower crane has different drives than a bottom Mewing revolving tower crane or a telescopic lulling crane or an excavator.

The configuration module can furthermore also have preconfiguration means for adapting the display device and the representation of the machine environment and/or of the piece of working equipment thereupon reproduced, wherein said preconfiguration means can preferably adapt the representation and/or the display device to the cameras present or usable at the respective remote controlled machine type and/or, if the representation is virtually calculated, can adapt the parameters for the calculation of the virtual representation to the respective machine type.

To be able to hold the tablet computer easily or to be able to carry it at the body, the remote control device can advantageously comprise a body installation apparatus for installing or holding the tablet computer at the body of the machine operator, with said body installation apparatus advantageously being able to include a neck strap and/or shoulder strap that can be placed around the neck and/or shoulder of the machine operator and that can be fastened to the tablet computer. To fasten the holding strap to the tablet computer, a holding frame can, for example, be provided into which the tablet computer can be pushed or inserted or fastened in a different manner and which can be connected to said strap.

Said neck strap and/or shoulder strap can advantageously be adjustable in length.

To be able to operate the tablet computer with a relaxed arm position, said body installation apparatus can comprise a spacer that positions the tablet computer spaced apart to the front from the stomach of the machine operator. Such a spacer can comprise a support strut that can, for example, be attached to the tablet computer in a fixed orientation via the aforesaid holding frame and supports the tablet computer with respect to the stomach or the front body of the user and holds it a little away therefrom.

To further facilitate the handling of the remote control device, a further electronic module can also be provided, in addition to said tablet, that enables or permits the input of control commands. Such an electronic module can in particular be integrated in a wristwatch that can form a so-called smart watch and can have a screen with a touchscreen function. Alternatively or additionally to such a screen having a touchscreen function, the wristwatch can, however, also have mechanical input elements to input control commands, for example push buttons, rotary buttons, or sliders. Said wristband electronic module is advantageously configured to input simple control commands, for example the commands "Up" and "Down" for the raising and lowering of the lifting hook of a crane. Such simple control commands can also be input in a secure manner via the wristband electronic module without using the aforesaid tablet computer for this purpose.

Such an additional electronic module can communicate with the tablet computer, for example over a Bluetooth connection or over a different suitable data communication connection. The control commands input at the additional electronic module can be transmitted to the tablet computer and can in turn be transmitted by it to the control apparatus of the machine to be remote controlled. Conversely, display signals can be transmitted from the tablet computer to the additional electronic module to be correspondingly displayed there.

Alternatively or additionally to such a triangular communication over the tablet computer, it is, however, also possible that said additional electronic module directly communicates with the control apparatus of the machine to be remote controlled, for example over a suitable radio connection or different suitable data communication means such as a router.

BRIEF DESCRIPTION OF THE FIGURES

The invention will be explained in more detail in the following with reference to a preferred embodiment and to associated drawings. There are shown in the drawings:

FIG. 7: a schematic representation of the screen of the tablet computer of the remote control device from the preceding Figures, with an actual image of the lifting hook of a crane from a camera being displayed on the screen and, faded in therein, touchscreen display means for inputting control commands being faded in.

DETAILED DESCRIPTION

Figure 1:
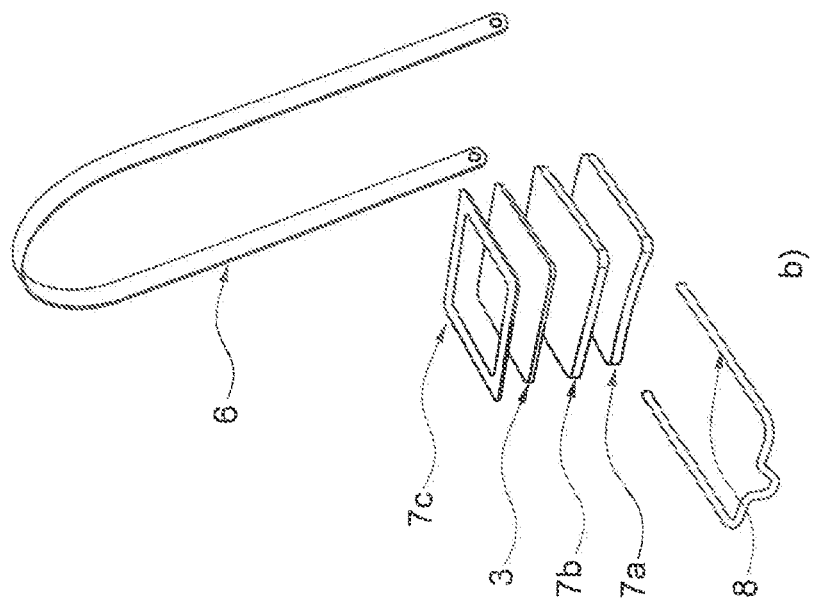
FIG. 1: a schematic representation of a remote control in the form of a tablet computer with a touchscreen for the remote control of a crane, of a construction machine, or of an industrial truck, with partial view (a) showing the holding device for the tablet computer in the installed state and partial view (b) showing the holding device in an exploded representation.
Figure 1:
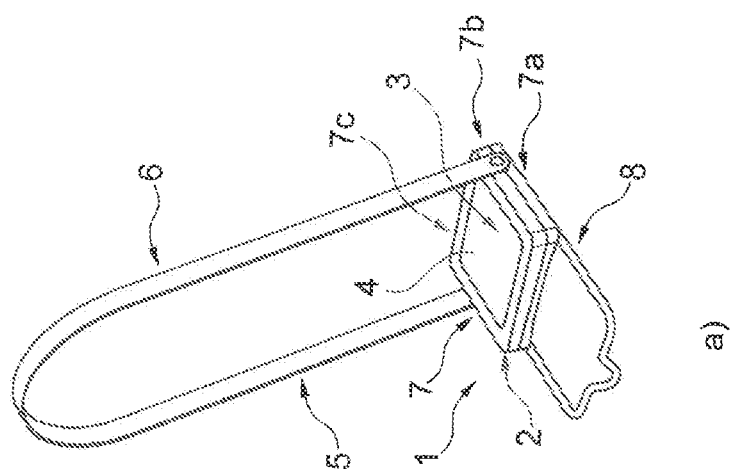

As FIG. 1 shows, the remote control device 1 can be configured as a crane remote control that comprises a mobile end device 2 in the form of a tablet computer 3 and that can, for example, be used for the remote control of a revolving tower crane, of a harbor crane, or of a maritime crane, or of a mobile telescopic crane. The remote control device may be configured for use for remote control of a crane 200, or other machine, including what may be characterized as a construction machine 230, industrial machine 240, or pallet truck 250.

Figure 4:
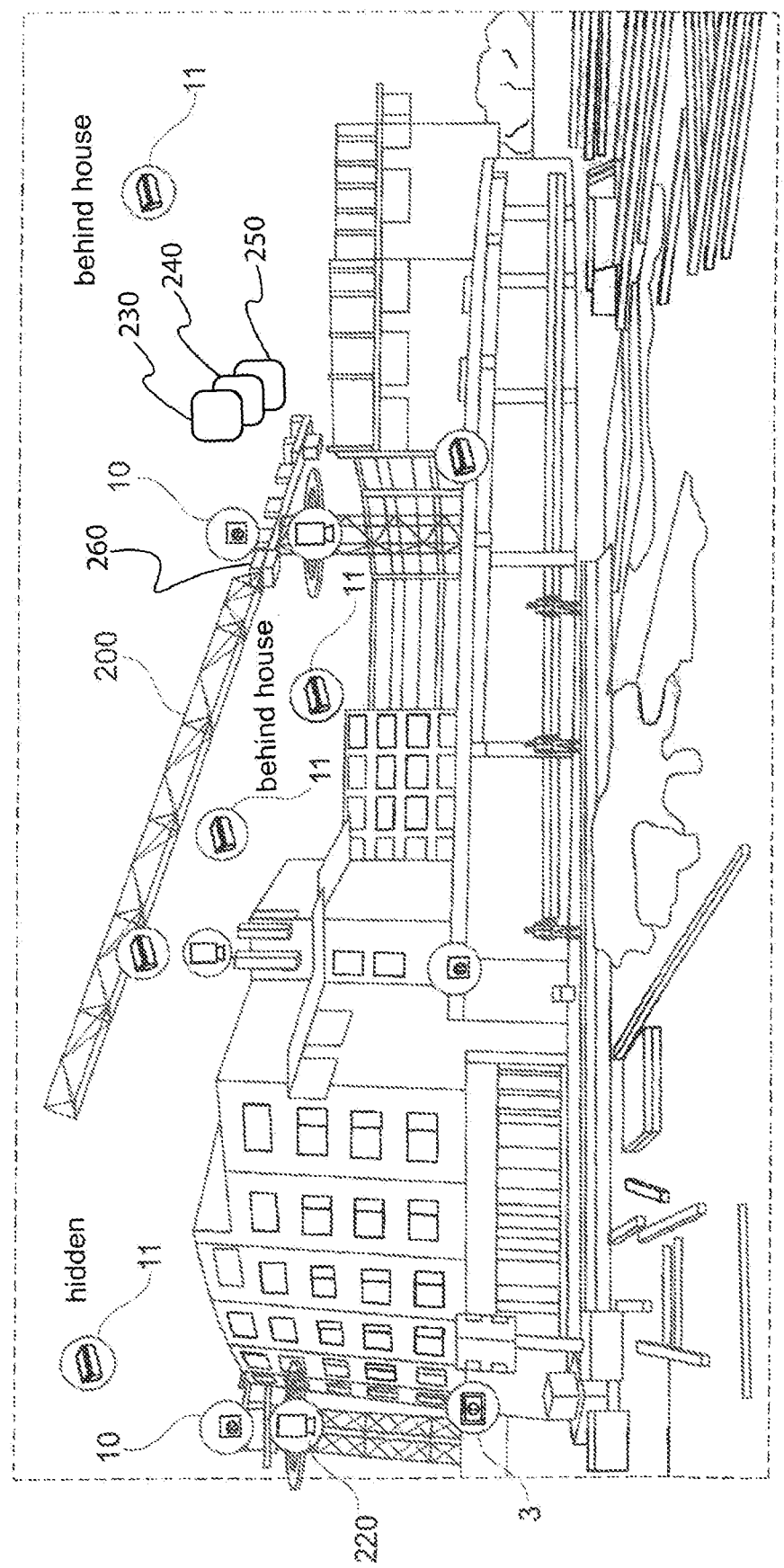
FIG. 4: a schematic representation of a crane in its working environment of a construction site and of the components of the remote control device for the crane from the preceding; Figures.

The crane 200 can here be configured as a revolving tower crane whose tower bears a boom at which a trolley is travelably supported, cf. FIG. 4. The boom can be rotated about an upright axis together with the tower or also without the tower—depending on the configuration of the crane as a top slewer or as a bottom slewer—for which purpose a stewing gear drive is provided. The boom could optionally also be configured as being able to be luffed up and down about a horizontal transverse axis, with a suitable luffing drive being able to be provided, for example, in interaction with the boom guying. Said trolley can be traveled by means of a trolley travel winch or of a different trolley travel drive.

As FIG. 1 shows, said remote control device 1 can comprise an in principle commercial tablet computer 3 that can be configured by importing corresponding software modules, for example by downloading apps, for the remote control of said crane. The tablet computer 3 here comprises a screen 4 that substantially takes up the total front side of the tablet computer 3 and that can be configured as a touchscreen.

To be able to hold or guide the tablet computer 3 better, a body installation apparatus 5 is provided by means of which the tablet computer 3 is held at the body of a machine operator. Said body installation apparatus 5 can here advantageously comprise a carry strap or belt 6 that can be configured as a neck strap or optionally also as a shoulder strap and that is intended to be hung at the neck or at the shoulder of the machine operator. Said carry strap 6 can here be adjustable in length to be able to set the carrying position at the body.

Said carry strap 6 is connected to the tablet computer 3 by a holding frame 7 to which the panel-like flat tablet computer 3 can be releasably fastened. As FIG. 1 shows, the holding frame 7 can be formed in multiple parts and can have a sandwich-like structure between whose parts the tablet computer 3 is held. For example, a tub-like bottom housing 7a can be provided in which the tablet computer can be placed with an exact fit, optionally while interposing a soft material 7b or a soft case part that can, for example, comprise a soft plastic and protects the tablet computer 3 from blows and/or compensates fit tolerances with respect to the tub-shaped bottom housing. A cover frame 7c can be placed onto the tablet computer 3 from above to hold it in the bottom housing 7a.

The body installation apparatus 5 can advantageously comprise a spacer S that can be attached to the holding frame 7 in a predefined orientation, and in particular oriented projecting from a narrow side of the tablet computer 3, to hold the tablet computer 3 supported to the front from the stomach of the machine operator. As FIG. 1 shows, such a spacer 8 can, for example, be configured as a support hoop that can advantageously be pushed into the holding frame 7 to be stowed in a transport position and that can conversely be extended to support the tablet computer 3 in the work position in accordance with partial view (a) of FIG. 1.

Figure 3:
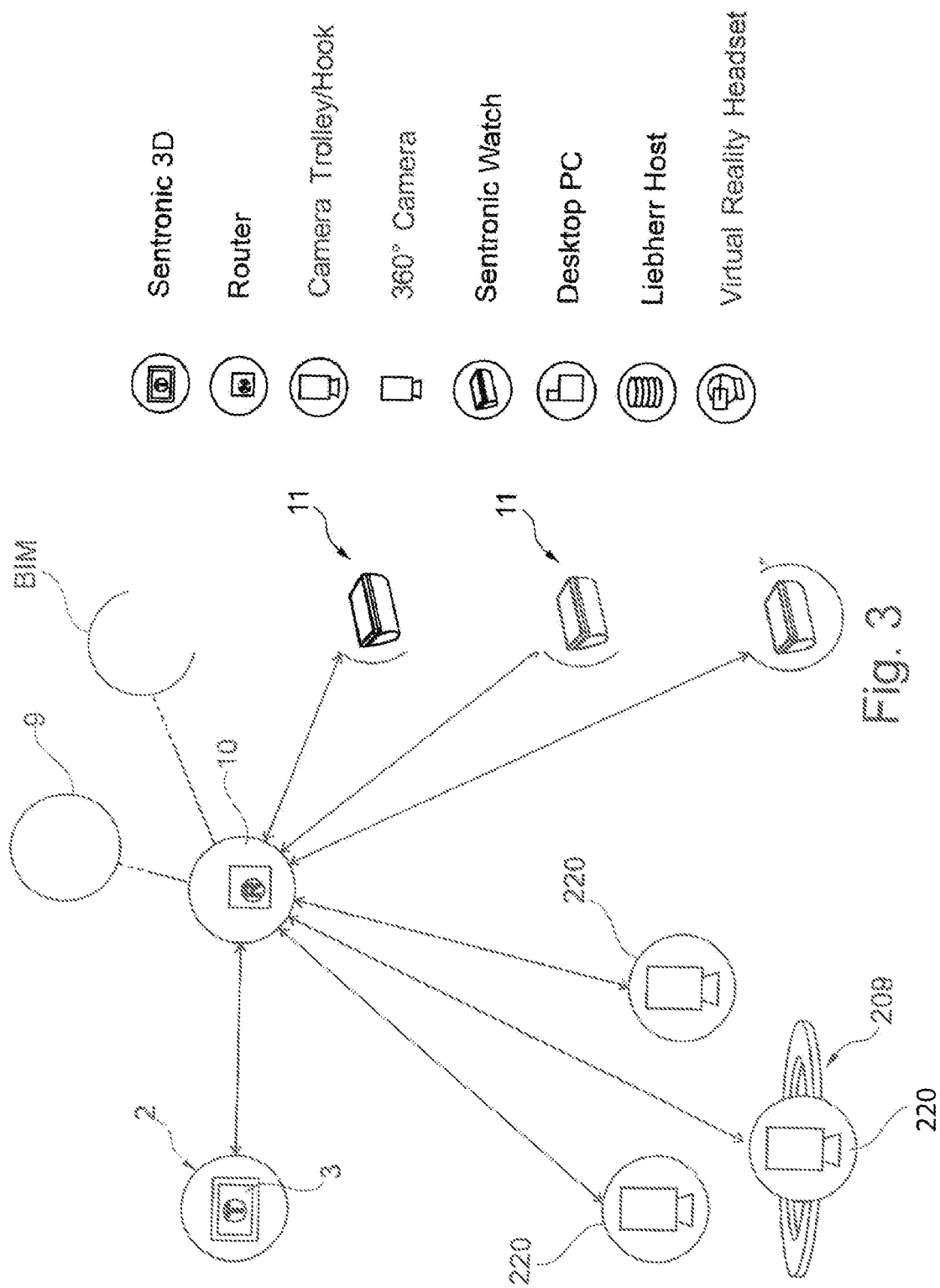
FIG. 3: a schematic representation of the system architecture of the remote control and its components from the preceding Figures.

As FIG. 3 shows, the tablet computer 3 can communicate via a preferably cableless data communication connection with a control processor 9 that can directly be the control processor of the crane or can form its control apparatus, or is alternatively a construction site processor that can in turn communicate with one or more control apparatus of one or more cranes. As lag. 3 shows, said control processor 9 can here comprise a router 10 to which the tablet computer 3 is connected, on the one hand, and to which further electronic modules are connected, on the other hand.

Figure 2:
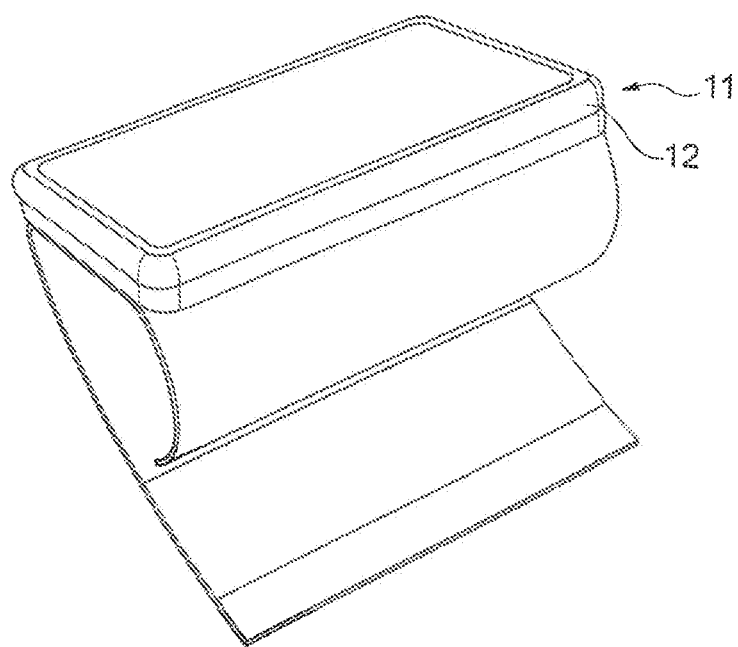
FIG. 2: a schematic, perspective representation of an additional electronic module of the remote control device that is configured as a wristwatch and that permits the input of control commands such as "Up" and "Down" for the lifting hook of the crane or similar control commands.

Furthermore, as FIG. 2 shows, an additional electronic module 11 can be part of the remote control device 1, which electronic module 11 can, for example, be configured in the form of a wristwatch or can be wearably fastened to the body in a different manner. Said electronic module 11 can in particular be configured as a so-called smart watch 12 that can comprise a screen having a touchscreen function to be able to input control commands for the crane.

Control interfaces that permit the input of control commands can be displayed on the screen on said tablet computer 3 and on the additional smart watch 12, that can optionally also be configured as a cellphone, by importing corresponding software modules. Respective touchscreen display means 13 in the form of graphical symbols such as arrows, pictograms, or letters and/or numerical symbols can be displayed on the screen 4 of the tablet computer 3 and on the screen of the smart watch 12 and trigger a corresponding control command on being touched by a finger or by a part of the hand, as is known per se as a touchscreen technique.

However, in this respect, not only said control commands or the touchscreen display means 13 representing them are displayed on the tablet computer 3, but advantageously also an actual image of the machine environment or working environment and/or a virtual representation of the working environment or of the building to be erected and/or of other elements or pieces of information helpful for the work process.

As FIG. 3 shows, the tablet computer 3 is connectable for this purpose via said router 10 to a BIM, that is to a so-called construction site information model, that can be stored in the control processor 9 or that has access to the control processor 9. The tablet computer 3 can optionally also communicate directly with said construction site information model while bypassing the router 10. Corresponding digital building information and/or construction site information or other relevant digital information that can be displayed on the screen 4 of the tablet computer 3 can be imported to the tablet computer 3 via a corresponding data interface from the construction site information model BIM. Virtual representations of the building to be erected and/or of the working environment of the crane can in particular be displayed with reference to the BIM data.

Alternatively or additionally to such a virtual representation, however, a real camera-generated representation of the crane environment and/or of the lifting hook can also be used at the tablet computer 3. At least one camera whose live images are transmitted to the tablet 3 can be installed at the crane 200 for this purpose. Such a camera 220 can, for example, be installed at the crane operator's cab 260 of the remote controlled crane 200 and can advantageously have at least approximately an axis of view that corresponds to the axis of view of a crane operator in the crane operator's cab and/or that goes from the crane operator's cab to the lifting hook.

Alternatively or additionally, however, different cameras and/or representations can be recorded from different perspectives and can be transmitted to the tablet computer 3 to be displayed there. An aerial drone can in particular be used that is equipped with at least one camera and that can be moved by remote control relative to the crane 200.

To be able also to see the lifting hook that may be connected to a hoist rope running down from a trolley or a load received thereat or the environment of the lifting hook 208 when the lifting hook 208 is outside the range of vision of the crane operator's cab 260 or of the crane operator, as may be the case, for example, when the load is to be placed down behind a building, an aerial drone 209 is provided in accordance with the invention such that at least one camera 220 may provide a camera image of the lifting hook 208 and/or of the lifting hook environment. Said camera image is advantageously a live image or a real-time image in the sense of a TV image or video image and is wirelessly transmittable from the camera 220 of the aerial drone 209 to the display of the tablet 3.

The aerial drone 209 is provided with a remote control device that permits the aerial drone 209 to be remote controlled, in particular the flight control units such as rotor blades to be controlled to remote control the flight position of the aerial drone 209 and/or to remote control the camera 220, in particular with respect to the panning angle or the viewing axis of the camera 220 relative to the body of the aerial drone 209 and/or the focal length of the camera 220.

A corresponding remote control module can be provided in the mobile operating unit 2. The tablet computer 3 can in particular have an invokable control menu for the aerial drone 209 by means of which the flight position of the aerial drone 209 relative to the crane 200, in particular relative to its trolley, can be controlled. For example, a desired position relative to the trolley and/or relative to the lifting hook, to then be independently (traveled to and) held by the aerial drone 209, may be input via corresponding touchscreen control elements.

To enable a simple operation however, a voice control and/or a selection menu control can also be provided for the aerial drone 209, for example to select a desired relative position from a plurality of predefined relative positions of the aerial drone 209 relative to the crane. This can be done, for example, in that "drone position 1" is input by voice control and/or by menu control that can be stored in a preprogrammed or predetermined manner in the position control apparatus.

The tablet computer 3 is advantageously configured to select a desired camera image from a plurality of provided camera images.

Virtual representations that are generated with reference to the digital data imported from the construction site information model BIM may be faded into the respective selected camera image that is displayed on the screen of the tablet computer 3. The representations may be faded into the respective selected camera image displayed by fade-in and/or by image assembly so that the screen of the tablet computer 3 equally displays the real actual image that is provided by a camera and, faded therein, virtual representation elements of the working environment such as a building contour.

Figure 7:
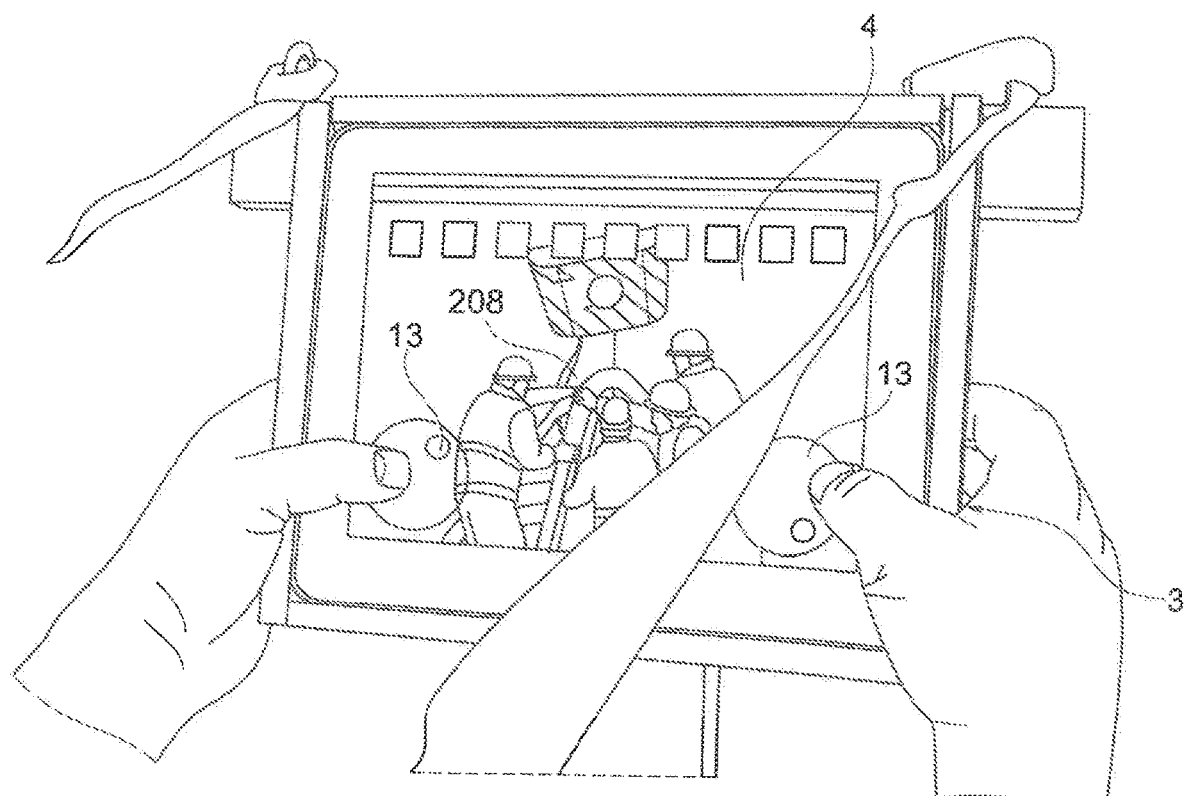

As FIG. 7 shows, touchscreen display means 13 for inputting control commands can furthermore also be faded into the image shown on the screen of the tablet computer 3, with zoom control means being shown in the example of FIG. 7 shown for zooming in on the shown lifting hook 208 or for changing the focal length and/or field of view of a camera.

If the remote-controlling machine operator wants to adjust or travel a machine part, for example to raise or lower the crane hook 208 shown on the screen in FIG. 7, the tablet computer 3 can, for example, be configured such that a tapping of a marginal screen bar causes the available control commands to be displayed in the form of a control window that expands outward or pops up. Touchscreen display means 13 such as travel arrows in specific directions can be displayed therein and tapping them then causes a corresponding travel.

Alternatively or additionally, the tablet computer 3 can also be configured to have the machine element to be adjusted or to be traveled identified by tapping the screen of the tablet computer 3 and then to generate a corresponding control command by dragging or pushing the tapped image element on the screen. The lifting hook 208 shown on the screen of the tablet computer 3 in FIG. 7 can, for example, be tapped, which the tablet computer 3 interprets as a desire for a positional adjustment of the lifting hook. If then, for example the finger tapping the lifting hook, swipes up or down on the screen of the tablet computer, the tablet computer 3 can interpret this as a desire for an upward or downward adjustment and can generate a corresponding control command. Such a swiping technique permits a particularly intuitive operation of the machine to be remote controlled.

Alternatively or additionally to such a control command generation on the tablet computer 3, the machine operator can also input a corresponding control command via the aforesaid smart watch 12.

As FIG. 3 shows, the remote control device 1 can work in direct association with a machine to be remote controlled, with in this case the tablet computer 3 and the possibly present electronic components 11 being able to communicate with the control apparatus of the respective machine via said router 10.

Figure 5:
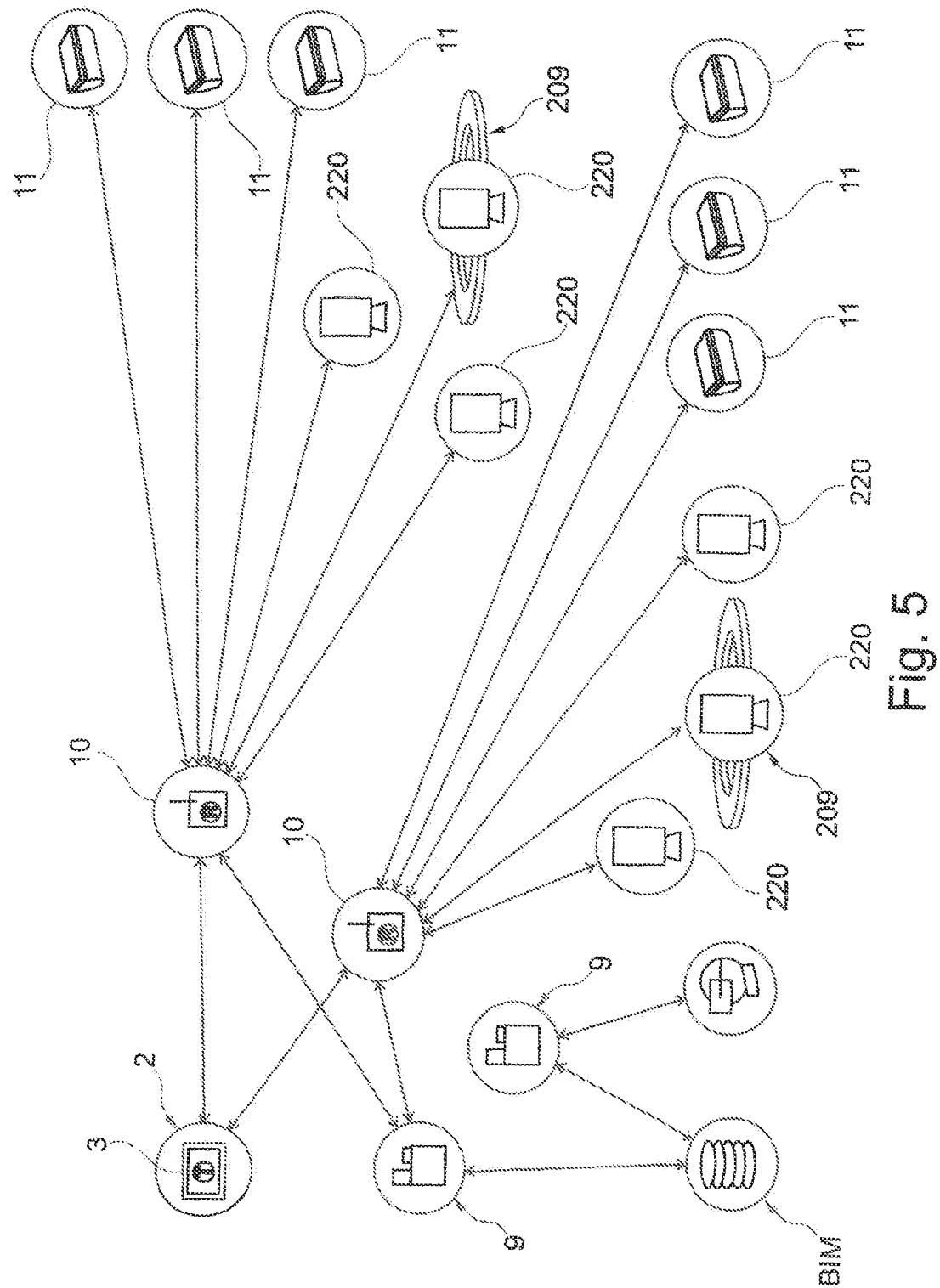
FIG. 5: a schematic representation of the system architecture of a plurality of remote control device that are networked with one another for the remote control of a plurality of cranes or similar machines.
Figure 6:
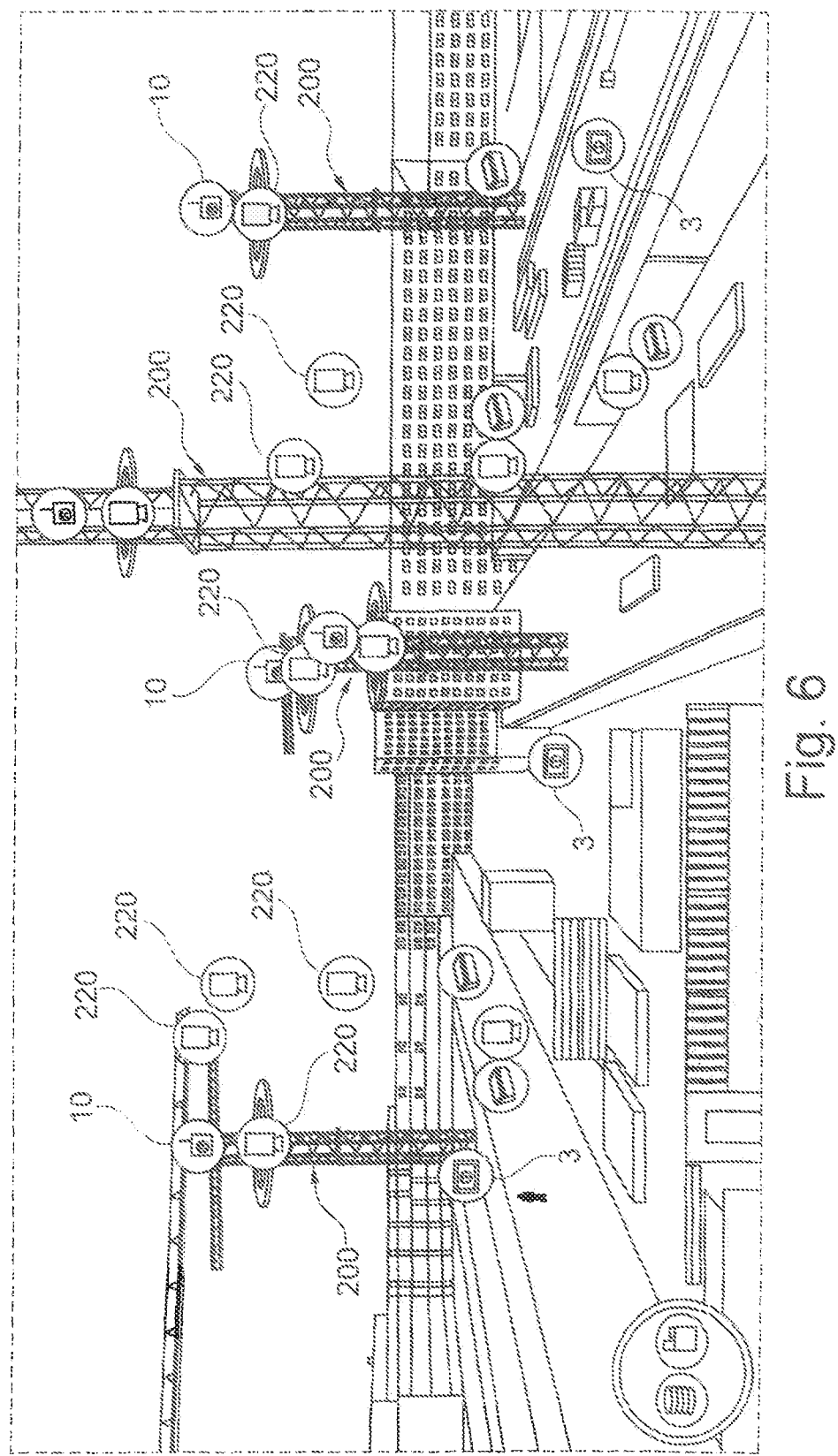
FIG. 6: a schematic representation of a plurality of cranes that are operable using the mutually networked remote controls of FIG. 5.

As FIGS. 5 and 6 show, a plurality of remote control devices can, however, also work in a networked manner with one another to be able to remote control a plurality of machines such as the cranes 200 of a construction site, with six cranes being able to be controlled by means of three remote controls 1, for example. A plurality of cranes can be accessed by one remote control 1 for this purpose via the network by which the remote controls 1 are networked with the cranes. For this purpose, the respective tablet computer 3 can, for example, comprise a selection menu by means of which one of a plurality of cranes that are connected to the network can be selected, whereupon the control commands generated at the tablet computer 3 are sent to the selected crane.

The invention claimed is:

1. A remote control device for a crane having a mobile end device in the form of a tablet computer;
the mobile end device comprising:
a screen comprising a display device having a touchscreen function, the screen further comprising at least one input device for inputting control commands, and
a signal transmission device for transmitting the input control commands to a control apparatus of the crane;
wherein the mobile end device is further configured to:
receive image data from a camera, and/or receive digital data from a building information model;
display a representation of an environment of the crane on the screen with reference to the received data of the camera, and/or to the digital data from the building information model; and
display the input device for inputting control commands at least simultaneously with the representation of the environment on the screen.

2. The remote control device according to claim 1, wherein the input device for inputting control commands is faded into the representation of the crane environment in a superimposed manner, or is displayed on the screen in a window next to the representation of the crane environment.

3. The remote control device according to claim 2, wherein the mobile end device includes a graphical simulation module for calculating a virtual representation of the environment, and the graphical simulation module includes a data interface for importing building information and/or construction site information; and
the mobile end device further comprises an image processing device for generating and/or adapting the virtual representation of the crane environment based on imported construction site information and/or building information.

4. The remote control device in accordance with claim 3, wherein the data interface is a CAD interface and the image processing device is configured for generating and/or adapting the virtual representation of the machine environment based on the CAD data imported via the CAD interface and/or is an image data interface and the image processing device is configured for generating and/or adapting the virtual representation of the machine environment based on the image data, imported via the image data interface.

5. The remote control device in accordance with claim 1, wherein the mobile end device has a display control apparatus for generating a superimposed screen representation in a manner of a virtual reality image on the screen that is assembled from the received image data of the camera and the received digital data from the building information model (BIM) and thus from a camera image of the machine environment and from a virtual representation of the machine environment and/or of a building.

6. The remote control device in accordance with claim 5, wherein the tablet computer is configured to display a camera selection menu for selecting the camera image of one of a plurality of cameras on its screen and to display the camera image after the selection of a camera.

7. The remote control device in accordance with claim 1, wherein at least one live camera is provided for providing a live image of the work tool and/or of the machine environment; and wherein the mobile end device has at least one image receiver for receiving the live image of the camera, which live image is based on the representation displayed on the screen.

8. The remote control device according to claim 7, wherein the at least one live camera is installed on a remote-controlled aerial drone; and the touchscreen display device further includes a position control device to remotely control the aerial drone to fly in different desired positions relative to the crane.

9. The remote control device in accordance with claim 1, wherein at least one camera for providing a live image of the machine environment is installed in an operator's cabin at the crane, at the construction machine, or at the industrial truck, having a direction of view at least approximately toward the work tool; and wherein the tablet computer has camera control device in the form of a touchscreen display device for the remote control of the angle of view and/or the zoom setting of the camera.

10. The remote control device in accordance with claim 1, wherein the tablet computer is configured to display a touchscreen control device for controlling the focal length and/or the field of view of a camera.

11. The remote control device in accordance with claim 1, wherein the tablet computer is configured to display a virtual representation of the structure in accordance with a determined actual state and/or a virtual representation of a next work task to be carried out by the construction machine on the screen of the tablet computer based on digital information from the building information model based on a specific construction phase; and/or to display a virtual representation of a next construction element to be worked and the installed position of the construction element at the building on the screen of the tablet computer based on digital data from the building information model.

12. The remote control device in accordance with claim 1, wherein the tablet computer is configured to change a working region boundary function taken into account by the construction machine control apparatus based on digital information from the building information model; and to dynamically display the changed working region boundary in the representation of the machine environment on the screen, and wherein the tablet computer is configured to automatically update and/or to automatically adapt cyclically or continuously the working region boundary function based on construction progresses at the building to be erected and/or to be worked while taking account of digital information from the building information model.

13. The remote control device in accordance with claim 1, wherein the tablet computer has a configuration module for a selective preconfiguration for adapting the input device in the form of the touchscreen display device to a selected machine type for one of a plurality of machine types.

14. The remote control device in accordance with claim 1, wherein the tablet computer is configured to communicate with different machines to be remote controlled over a network;
to display a selection menu for selecting one of a plurality of machines that are connected to the network; and to send generated control commands to the selected machine after selecting one of the plurality of machines on the screen.

15. The remote control device in accordance with claim 1, wherein at least one further electronic module, separate from the tablet computer, is provided for inputting control commands and is wearable and/or fastenable to a body of a machine operator.

16. The remote control device in accordance with claim 15, wherein the additional electronic module is configured as a wristwatch or as a wristband computer and has a screen having a touchscreen function.

17. The remote control device in accordance with claim 15, wherein the tablet computer and the at least one further electronic module provide at least partially mutually overlapping control functions for execution such that a control command desired by the machine operator can selectively be input on the tablet computer or on the further electronic module.

18. The remote control device in accordance with claim 1, wherein the tablet computer is configured to identify a machine part to be adjusted or to be traveled by tapping the representation of the machine part on the screen of the table computer;
   to detect a dragging and/or displacing of a tapped image element on the screen with respect to a direction and/or a degree and/or a speed of the displacement; and to generate a control command to travel the identified machine part based on the detected dragging and/or displacement.

19. The remote control device in accordance with claim 15, wherein a body installation apparatus is provided for installing the tablet computer at the body of the machine operator; and wherein the body installation apparatus comprises a holding frame having a fastening device for fastening the tablet computer and comprising a carry strap fastened to the holding frame, and wherein a spacer is attached to the holding frame to splay the tablet computer in front of the stomach of the machine operator.

20. A system comprising:
a remote control device having a mobile end device in the form of a tablet computer, the mobile end device comprising:
   a screen comprising having a touchscreen function, the screen having at least one input device for inputting control commands; and
   a signal transmission device for transmitting the input control commands to a control apparatus of a crane;
wherein the mobile end device is further configured to:
   receive image data from a camera and/or receive digital data from a building information model;
   display a representation of a crane environment on the screen with reference to the received image data of the camera and/or to the digital data from the building information model; and
   display the input device for inputting control commands at least simultaneously with the representation of the crane environment;
the system further comprising a communication connection between the crane and the remote control device, wherein control commands input at a control station of the remote control device are transmitted to a control device of the crane.

* * * * *